Where: $I_0 = A + R + T_S + T_D$
$T_T$ (Visual total transmission) $= T_S + T_D$
Transparency $= \dfrac{T_D}{T_S + T_D}$ or $\dfrac{T_D}{T_T}$.

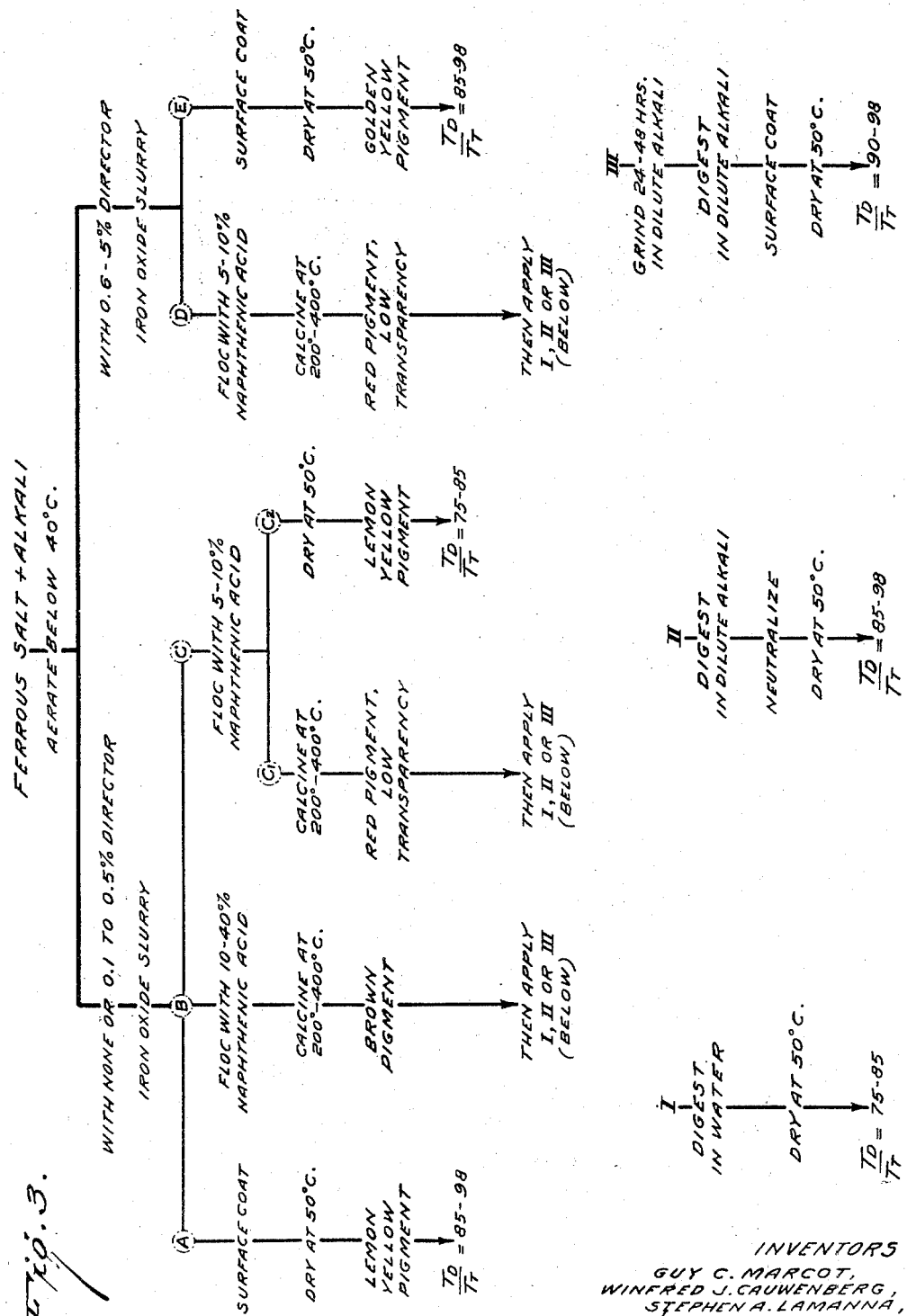

Patented June 26, 1951

2,558,304

UNITED STATES PATENT OFFICE 2,558,304

PRODUCTION OF IRON OXIDE PIGMENTS

Guy C. Marcot, Lynchburg, Winfred J. Cauwenberg, Piney River, and Stephen A. Lamanna, Amherst, Va., assignors to American Cyanamid Company, New York, N. Y., a corporation of Maine Application March 11, 1948, Serial No. 14,274

19 Claims. (Cl. 106—304)

The present invention relates to a method of preparing iron oxide pigments, and relates more particularly to a method of controlling and directing the crystal growth habits of the individual iron oxide particles.

It has long been recognized by the art that various iron oxide pigments are well adapted for use as coloring materials where it is desirable that light-fastness be one of the characteristics of the coating material. The prior art has also recognized that, under various conditions of manufacture, it is possible to produce iron oxide pigments ranging in color from a light lemon-yellow to a dark reddish-brown and that black pigments might also be produced. Iron oxide pigments have also been quite desirable from an economic standpoint, in that they may ordinarily be manufactured from waste products such as scrap iron, spent ferrous sulfate, mine waters, pickling liquors, and the like sources of waste materials which would otherwise present a serious disposal problem.

Inasmuch as it is a recognized fact that the coating ability of any pigment is dependent, among other things, on the refractive index and size of the individual particles and the coextensive surface area thereof, it has long been known that the most desirable iron oxide pigment would be obtained when the particles thereof were of optimum uniformity as regards size distribution. In order to obtain such pigment, it has been recognized that control over several operating conditions was necessary, i. e., acidity of the reaction medium, rate of oxidation, reaction temperatures, and the like.

Heretofore the preferred method of manufacturing the yellow to red iron oxide pigments has been based on the oxidation of ferrous sulfate solutions under controlled acid conditions. In most processes the acidity of the solution is maintained at a pH of about 3.5 either by the presence of metallic iron, which reacts with the acid liberated by the oxidation, or by adding alkaline materials such as sodium carbonate or sodium hydroxide. Acidic conditions were used because it was well known that oxidation of the ferrous iron was incomplete at higher pH values, and that under conditions approaching or slightly exceeding neutrality there were formed dark ferri-ferro compounds instead of the desired, clean colored hydrated ferric oxides.

The persent invention is based on the discovery that crystalline iron oxide pigments of shades varying from light yellow to brownish-orange can be obtained by carrying out the oxidation of the iron under strongly alkaline conditions, when the controlled factors hereinafter described are observed. Whereas, according to prior practice, the oxidation of iron under alkaline conditions has generally resulted in the production of black iron oxides, we have found that by proceeding according to our novel method, which will hereinafter be more fully described, we are enabled to produce light yellow to deep brownish orange colored pigments having exceptionally uniform particle size which are thereby rendered more effective as to coating ability and more commercially desirable because of improved color characteristics and tinting strength. Moreover, by the method of our invention it is possible to obtain substantially dry iron oxide pigments consisting of particles of such exceptionally small size that when they are incorporated in clear coating compositions, the final film is transparent. It will be evident that the production of such a transparent coating material, wherein the pigment employed is also light-fast, will have many commercial uses, such as for instance, in the production of printing inks, transparent coatings for the canning industry, various decorative coatings, and the like uses.

An additional feature of the invention resides in the fact that upon the application to the above-mentioned yellow to brownish-orange iron oxide pigments of certain heat treatments they may be transformed into transparent pigments ranging in color from orange-red or brown to deep maroon.

The invention will be further described and illustrated with reference to the accompanying drawings, in which.

Figure 1:
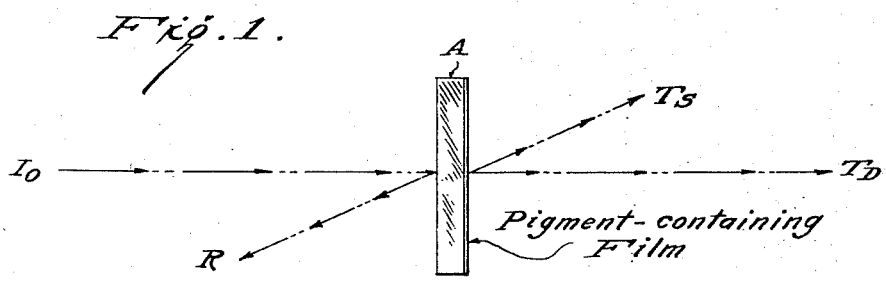
Fig. 1 is a diagrammatic illustration of the meaning of the term "transparency" as used in the present specification.

In its broadest aspects, our invention comprises the steps of first adding a ferrous salt such as ferrous chloride or ferrous sulfate to an aqueous solution containing a substantial excess of a free inorganic base of the type of alkali metal or alkaline earth metal hydroxides, i. e., an alkali-forming metal hydroxide, such as sodium hydroxide, potassium hydroxide, calcium hydroxide, magnesium hydroxide, and the like, which precipitates the iron, followed by oxidation of the precipitate. The minimum amounts of precipitating agents which must be employed will be hereinafter described in greater detail. The oxidation of the precipitated iron compound may be carried out over a period of time within the range of from about 15–30 minutes to about 30 hours or more depending on the desired size and degree of opacity of the final pigment and at temperatures lower than 40° C. Certain products of the above described process may thereafter be accorded various end treatments such as calcination and digestion to form red or brown colored pigments of varying degrees of transparency.

It has been found that the particle size of the ferric oxide produced as above described decreases quite rapidly as the oxidation rate is increased. Therefore, when it is desired that the final pigment be an opaque material having a relatively light yellow color, a longer oxidation cycle such as, for example, 20–30 hours will be employed. Under these oxidation conditions the final product will be composed of particles ranging from about 0.1 micron to about 1.0 micron or more in size. When it is desired to produce a transparent iron oxide pigment, the oxidation cycle should be within the range of about ½ hour to about 10 hours, dependent upon the other operating conditions. The final product thus produced will be composed substantially entirely of individual particles of 0.1 micron or less in diameter.

We have also found that, as the reaction temperature is decreased, the average particle size of the pigment is decreased. Thus, for example, while a satisfactory opaque pigment, where a certain degree of variation of particle size is tolerable, may be produced at a temperature of 40° C. over an oxidation cycle of from about 20 to about 30 hours, a more uniform and finer product will be produced when the reaction is carried out at a temperature of about 25° C. over an oxidation cycle of from about 5 to about 10 hours.

We have also found that the particle size range of the pigment may be most closely controlled and regulated to provide optimum uniformity and size of the particles by carrying out the oxidation of the precipitated ferrous compounds in the presence of materials capable of forming complexes with hydrated iron oxide. The most highly active of such crystal growth directors are sodium silicate or other form of active silica, tartaric, citric or tannic acid or water-soluble salts thereof, or water-soluble zinc salts. The preferred amounts of these materials to be added to the reaction medium are within the range of from about 0.1% to about 5% based on the weight of the $Fe_2O_3.H_2O$ equivalent of the iron salt present. The addition of amounts in excess of about 5% of these crystal growth directing materials does not further benefit the uniformity of particle size or the degree of transparency of the final product; i. e. the results are neither better nor worse than when 4–5% is used. On the other hand, while the use of amounts of 0.01% to 0.5% of any of these directors results in a decrease in the average particle size of the products, the employment of amounts of silica in excess of 0.5% of the $Fe_2O_3.H_2O$ equivalent of the iron salt results in the production of a different crystal type iron oxide pigment.

When an aqueous solution of, for example, ferrous sulfate containing the equivalent of from about 20–30 gm./liter of $Fe_2O_3.H_2O$ is treated with from about 150% to 300% of an alkaline agent such as those hereinbefore described and the solution is subjected to an oxidation cycle of from ½ hour to about 10 hours in the presence of from about 0.1% to about 5% of any of the above-mentioned crystal growth directors, the final product is composed of individual particles having a maximum size of not more than about 0.1 micron.

The presence of a crystal growth director during the oxidation of the iron precipitate also enables us to prepare iron oxide pigments of any desired degree of transparency, having optimum uniformity of size of the individual particles. Thus, for example, the addition of from about 0.01% to about 1% of $SiO_2$ in the form of sodium silicate to an aqueous iron salt solution prior to a relatively long oxidation cycle under the above-described alkaline conditions will produce a light yellow-colored opaque iron oxide pigment having greatly improved tinting strength and mass tone characteristics in addition to a much more pleasing texture. In fact, it has been found that the presence of such a crystal growth director aids in the preparation of iron oxide pigments, having improved texture, tinting strength and the like characteristics, according to some of the well-known prior art procedures wherein the oxidation of the iron salt is carried out under acid, neutral, or slightly alkaline conditions in producing opaque type pigments.

As noted above, the amounts of free inorganic base to be employed are in substantial excess of the stoichiometric requirement. When a crystal growth director is present the minimum quantity of free inorganic base such as sodium hydroxide or potassium hydroxide is 115%; in the absence of a crystal growth director the minimum quantity is about 130% of the stoichiometric requirement. There is no upper limit of inorganic base addition other than that of economy, but employment of amounts in excess of about 200% of theory, as for example amounts of from 400% to 600%, have not resulted in further advantages. However, within the range of from 115% to about 130% of the stoichiometric requirement of free inorganic base the product will be discolored by the presence of the dark ferri-ferro compounds unless a crystal growth director such as those hereinbefore described is also present in an amount of at least 0.1% based on the $Fe_2O_3.H_2O$ equivalent of the iron salt.

The employment of the above stated strongly alkaline reaction conditions results in the production of iron oxide pigments which may thereafter be dried to powders which are readily redispersible into various vehicles. Whereas the prior art methods of producing iron oxide pigments under acidic conditions were productive of pigments containing appreciable amounts of combined sulfates or other anions, the present invention affords a decided advantage thereover by virtue of the fact that our alkaline reaction conditions produce iron oxide pigments containing less than about 1% of combined anion of the initial ferrous salt. We have found that our dry iron oxide pigments, containing not more than about 1% of combined anion, are capable of being readily redispersed in various vehicles, especially after the finishing treatments which will hereinafter be fully described, whereas the prior art products containing greater amounts of combined anion become tenaciously aggregated upon drying and are thereafter incapable of being satisfactorily redispersed into coating vehicles.

In a specific embodiment of the invention wherein it was desired to produce a transparent, light yellow iron oxide pigment, caustic soda in an amount of 200% of the stoichiometric requirement was added to an aqueous solution of ferrous sulfate containing approximately the equivalent of 30 gm. per liter of $Fe_2O_3.H_2O$ at a temperature of about 25° C. Thereafter air was bubbled through the reaction medium for about 3 hours while maintaining the temperature of the mixture at about 25° C. after which time all of the ferrous ions had been converted to the ferric state. The precipitate was then filtered, thoroughly washed with water, and dried.

One of the outstanding features of this invention was then discovered in conjunction with the above-produced material. It was found that this pigment may be incorporated in a clear lacquer or other coating material in amounts within the range of from about 0.5% to about 5% or more based on the non-volatile components of the coating material, and the dried film is transparent.

Figure 2:
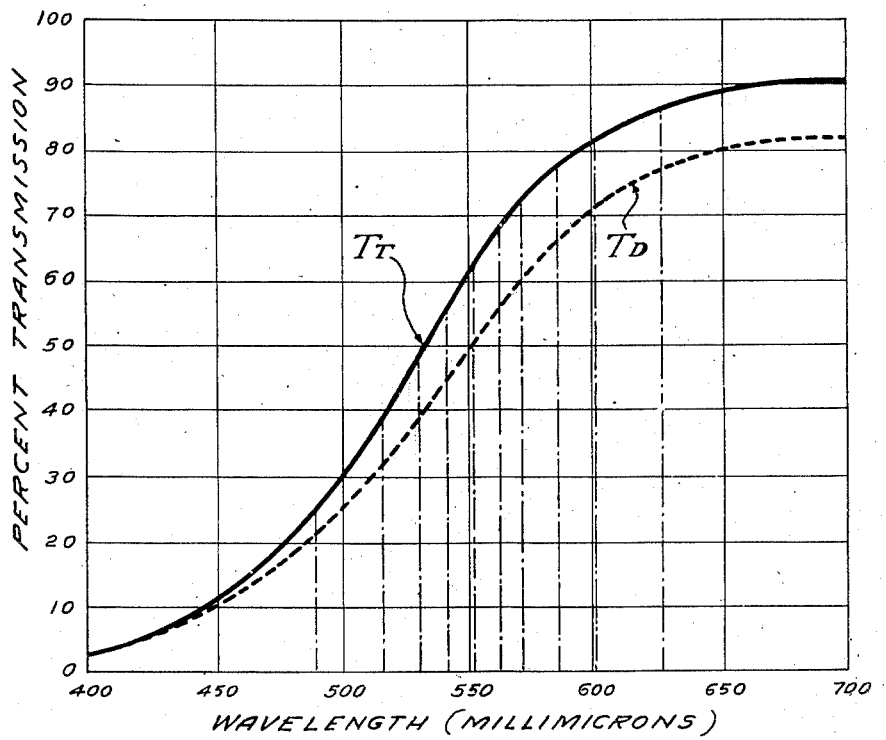
Fig. 2 is a graph showing the direct transmitted light and the total transmitted light passing through a film pigmented with a representative iron oxide pigment of the invention; and, Fig. 3 is a flow sheet illustrating representative manufacturing methods for the production of transparent iron oxide pigments.

To more clearly define the term "transparent," as it is used in this description, reference will be had to the accompanying drawings. Fig. 1 is a diagrammatic representation of the transmission of a beam of light through a piece of plate glass coated with a film containing a partially transparent pigment, and Fig. 2 is a visual range transmission curve indicating the amount of light transmitted by a film containing a transparent iron oxide pigment at the various wave lengths of the visual spectrum.

In Fig. 1 it will be observed that part of the light striking the glass is reflected as shown by R. Another portion of the light, absorbed by the glass and film, is represented by A. The light which is transmitted emerges partially undeviated and partially scattered as represented in the drawing by $T_D$ and $T_S$ respectively. The total light transmitted ($T_T$) is the sum of $T_D$ and $T_S$. In defining visibility, only light which is transmitted is of importance and, therefore, that portion of the incident light which is reflected and/or absorbed may be disregarded. Therefore, the formula $$\frac{T_D}{T_T}$$

represents the visibilty value of any pigment-containing film capable of transmitting light.

In measuring the amount of light which is transmitted by a film containing our novel iron oxide pigment, a beam of light is passed through a sheet of clear plate glass which has been coated with a film containing a small amount of the pigment and the total transmitted light and the direct transmitted light is measured spectrophotometrically over the entire visual spectrum (400–700 mu).

The data are obtained in the form of a graph such as that of Fig. 2 of the drawings. We have found it most convenient, in calculating the visibility of the radiant energy represented by the curves of Fig. 2, to employ those selected ordinates set forth on page 51 of the "Handbook of Colorimetry," by Arthur C. Hardy, 1936. These are 489.4, 515.1, 529.8, 541.4, 551.7, 561.8, 572.5, 584.8, 600.7 and 627.1.

It will be understood by those skilled in the art that these selected ordinates have been so chosen as to give visibility values which are those that the standard observer would see when the samples are irradiated by light having the spectral quality of illuminant C, the characteristics of the standard observer and illuminant C having been established by the International Commission on Illumination. In computing the transparency or visibility values, the sum of the values of $T_D$ for these selected ordinates is divided by the sum of the values of $T_T$, as shown for example in Fig. 2.

It will be apparent that those pigmented films which present the highest figures are those which transmit undeviated the greater portion of light and which are, therefore, more truly transparent than those having relatively smaller $$\frac{T_D}{T_T}$$

values. It has been found that only those pigments which afford pigmented films having visibility values of 75 or more may be regarded as being highly transparent. Those pigments giving lower values, while capable of producing films which transmit sufficient light so as to render them adequate for certain purposes produce films which still present a somewhat murky appearance, indicating that the individual particles are too large, or that some aggregation of the pigment particles has occurred.

The method we have employed to determine the degree of transparency of our novel iron oxide pigments has been chosen because of the facility with which such measurements may be made and because the standard films containing our pigments are comparable to those employed by industry and thus present a valuable and accurate index of the practical merits of each of the pigments. It will be seen from the formula by which the values of our novel iron oxide pigments are obtained that transparency or visibility is a function of light scattering of the pigment. Thus, for pigments possessing high transparency or visibility values, the thickness of the pigmented coating films is of no consequence. However, when the visibility value of the pigmented film is relatively low, the thickness of the film becomes quite important. For this reason the standard film described herein, and employed in the examples, is, ordinarily one having a wet thickness of 0.005 inch. However, we have also demonstrated that the pigment concentration in the coating films may be varied within wide limits. Samples of the various dried finished pigments were ground in a volatile organic solvent such as toluene, xylene, benzene, and the like solvents, and the pastes produced were spread out on sheets of clear plate glass. When the solvent had evaporated, the films obtained consisted of about 70% pigment and about 30% of finishing materials which are hereinafter fully described. The transparency or visibility values of these concentrated pigment films were consistently greater than 85, thus indicating that our novel iron oxide pigments are finely dispersed and substantially free of aggregates in the coating films prepared therewith.

As hereinbefore stated, one of the factors contributing to accurate regulation of the crystal growth habits of iron oxide is the oxidation rate. One of the methods by which the oxidation of iron salts in aqueous suspension may be hastened is by means of affording a greater or lesser amount of oxygen to the reaction medium. However, where an oxygen-containing gas is to be employed, the rate of addition of oxygen or oxygen-containing gas to the medium is dependent to a large extent on the size of the gaseous bubbles passed through the medium. When the size of these gaseous bubbles becomes too great, the effective use thereof is diminished in that a greater proportion of the oxygen merely passes through the medium and to the atmosphere without effectively coming in contact with the iron compound. It is, therefore, of importance that the size of the bubbles of gaseous material passed through the reaction medium be maintained in as fine condition as possible. To this end it has been found that the addition to the reaction medium of a small amount of a frothing or surface tension reducing agent of the type well-known in froth flotation of minerals, such as sodium ricinoleate, pine oil, etc., is of great advantage in providing minute gaseous bubbles which are thereby enabled to come into relatively intimate contact with the iron present in the solution and thus more rapidly accomplish the oxidation thereof. It is to be understood, however, that the oxidation of iron compounds according to the method of this invention is not limited to the use of gaseous oxygen-containing materials. The oxidation of such compounds may be readily conducted by the employment of chemical oxidants such as hydrogen or sodium peroxide or sodium hypochlorite and the like oxidants.

It has been discovered as has hereinbefore been stated that iron oxide pigments containing less than about 1% of combined anion may be prevented from aggregating by a coating treatment whereby the individual particles are coated with a substantially mono-molecular layer of an alkali-soluble, acid insoluble lyophilic organic coating material. Pigments so treated may be dried according to well-known procedures and the dry powder is free from aggregation; additionally, while the coated pigment is still in water slurry form it is more easily filterable and more easily processed to produce a powder which is entirely suitable for forming transparent films and, in the event that the pigment is of the opaque type, has a more desirable texture and tint tone. The materials which are suitable as coating agents are those acids and esters of high acid number containing more than about 10 carbon atoms, such as, coconut oil fatty acids, oleic acid, ricinoleic acid, talloil fatty acids, naphthenic acid, lauric acid, myristic acid, various fish oil acids, and the like acid materials, containing up to 22 carbon atoms, as well as various synthetic resins such as diethylene glycol modified castor oil-azelaic acid alkyd resins, non-oxidizing 2-ethylhexoic acid-pentaerythritol alkyd resins, rosin-dibasic acid type resins, terpene-dibasic acid type resin, and the like resins. These and similar materials are ordinarily used in the form of their alkali metal, ammonium, amine or other water-soluble or water-dispersible salts or soaps.

The naphthenic acids are especially useful coating or flocculating agents in preparing some of the red to brown pigments of the present invention, either transparent or non-transparent, as will be subsequently explained in greater detail. The term "naphthenic acids," as used in the present specification, is intended to mean the alicyclic carboxylic acids of petroleum origin which are predominantly of the series $C_nH_{2n-4}O_2$ and $C_nH_{2n-6}O_2$ in which $n$ is a whole number from about 8 to 24 as described in Ellis "The Chemistry of Petroleum Derivatives" (1934 edition) chapter 48. Ordinarily commercially available mixtures of these acids are used, such as a mixture containing 88% saponifiable and 12% unsaponifiable. The average molecular weight of the commerically available grades is from about 180 to 280, which corresponds to a carbon atom content of from about 11 to 18. Mixtures having oil-included acid numbers of 174, 100, 232 and 97, with corresponding oil-free acid numbers of 190, 177, 247 and 186 and unsaponifiable contents (percent by weight) of 9, 43, 7 and 47.5 are available from the Oronite Chemical Co., San Francisco, California.

In carrying out this coating treatment, it is preferable that the amount of coating material to be used is within the range of from about 10% to about 100% based on the weight of the iron oxide pigment and dependent on the pigment specific surface area and the particular, for example, fatty acid employed. It has been determined that about 30% by weight of a ricinoleic acid coating material will afford a coating on the pigment particles which is substantially mono-molecular in nature when the pigment has a specific surface area of about 150 square meters per gram. In a preferred method of carrying out this treatment, the precipitated iron oxide, before the filtering and water-washing treatment, is treated with sufficient ricinoleic acid to form a mono-molecular layer; the necesary quantity will ordinarily be from about 15% to about 50% depending on the average particle size of the pigment. The mixture is thereafter acidified and the fatty acid is thereby deposited uniformly over the pigment particles. The pigment is then dried at temperatures ranging from about 40°–70° C. The dried pigment contains no aggregates which are visible under a microscope at about 500 magnifications and the dry powder exhibits exceptionally good texture, and when the pigment is of the transparent type, exceptional transparency. However, the production of iron oxide pigments coated with a lyophilic organic coating agent generally is not claimed broadly in the present application since this constitutes the subject matter of our copending application Serial No. 767,068 filed August 7, 1947.

We have found that our lemon yellow-golden yellow iron oxide pigments may be transformed to red or brown colored pigments, most of which possess hematite crystal structure, by a calcination treatment. The precipitated iron oxides are preferably calcined at temperatures of about 200°–400° C. for periods of time ranging from a few minutes to about 3 or more hours. The calcination period is inversely proportional to the temperature employed. Therefore, when the calcination temperature is about 400° C., the color transformation occurs in a very short period of time as, for example, about 15 minutes. On the other hand, when a calcination temperature of about 200° C. is employed it has been found necessary to conduct the heat treatment over a period of about 3 or more hours in order to obtain a red or brown colored iron oxide pigment.

Immediately after calcining, the iron oxide pigments are of relatively low transparency. When it is desired to produce red or brown colored iron oxide pigments possessing transparency values of from about 75 to about 98, the calcined products are therefore subjected to a digestion treatment in water or dilute alkali, and the digestion treatment may, where desired, be preceeded by a mechanical grinding in water or dilute aqueous alkali to disintegrate any aggregates formed during calcination. The dilute alkali solutions which may be used in this treatment preferably contain up to 1% of $Na_2CO_3$ or 1% of NaOH, with pH values of about 10.5 and 12.5 respectively. The digestion treatment, when carried out in an alkaline medium, is preferably followed by a neutralization step to render the dispersed iron oxide pigment particles more easily filterable. The neutralization treatment may consist in the simple addition of an acid such as sulfuric or hydrochloric acid, or it may be part of a surface coating treatment such as has been hereinbefore described. The digested materials are thereafter dried at relatively low temperatures as, for example, from about 40° C. to obtain products having transparency values ranging from 75 to about 98.

From the foregoing description it will be seen that the outstanding features of the present invention are:

(1) Maintenance of the reaction temperature at all times below about 40° C.

(2) Carrying out the oxidation under alkaline conditions, using either a minimum of 115% of free inorganic base with a crystal growth director or a minimum of 130% of the free base when the crystal growth director is absent.

(3) Control of the combined anion of the initial ferrous component so that the content thereof in the final product is less than 1% of the weight of the pigment.

(4) Variation of the oxidation cycle within the range of from about ½ hour to about 30 hours, depending on the desired size and transparency of the final product.

(5) Regulating the uniformity of particle size of the product by the inclusion, where it is desired, of small amounts of a crystal growth director.

(6) Coating the iron oxide pigment particles with a substantially mono-molecular layer of an alkali-soluble, acid-insoluble lyophilic organic coating agent which is preferably a water-insoluble organic carboxylic acid ester.

(7) Alternatively producing red or brown colored transparent iron oxide pigments by calcination and digestion treatments accorded the initial iron oxide precipitates followed, if desired, by coating as in (6).

By the proper regulation of any one or any combination of these control features, we are enabled to regulate the growth and crystal-forming habit of iron oxide to obtain products comprising opaque, or semi-transparent, or transparent pigments consisting of substantially uniformly sized particles.

Particular methods of applying the principles of our invention to the production of transparent iron oxide pigments are illustrated on Fig. 3 of the drawings. Referring to this figure, it will be seen that in all cases the slurry obtained by adding 115% to 130% or more of the stoichiometric equivalent of an alkali to an aqueous ferrous salt solution is aerated or otherwise oxidized at a temperature below 40° C.

As is shown on the drawing, the color and type of transparent pigment that is obtained is influenced by the quantity of crystal growth director that is used during the oxidation procedure. When no crystal growth director is employed, or with relatively small quantities within the range of 0.01% to 0.5%, pigments of somewhat lighter and more yellow shades are obtained. For the direct production of transparent type pigments by the methods previously described the oxidized precipitate is surface coated and dried, as at A and E on the drawing, whereby lemon yellow or golden yellow transparent pigments are obtained.

In producing many of the transparent type pigments the average particle size of the oxidized precipitate obtained from the aeration step is so small that the dewatering of the hydrated iron oxide slurries by filtration or sedimentation is frequently very slow. With these pigments the surface coating procedure serves the important purpose of flocculating the slurries in addition to its function of coating the particles thereof. When an uncoated, or relatively incompletely coated pigment is desired, the manufacturing procedure is greatly facilitated by flocculation of the oxidized slurry with an organic flocculating agent of the same type that is used for coating, representative examples of which have been previously mentioned. Naphthenic acid mixtures are particularly useful flocculating agents for this purpose and are shown on the drawing, although it is understood that coconut oil fatty acids and other similar flocculating agents may be substituted. As shown at C on the drawing the slurry may be flocculated by the addition of as little as 5-10% of one of these organic flocculating agents, after which it is dewatered by filtration or settling, dried at relatively low temperatures as shown at C₂, and a product obtained which is definitely of the transparent type and which has only a slightly lower degree of transparency than the fully surface-coated pigments.

Brown transparent iron oxide pigments may be obtained by calcining an initial hydrated ferric oxide slurry prepared with none or with not more than about 0.5% of a crystal growth director. This slurry is flocculated with at least 10% and preferably about 10–40% of an organic flocculating or surface coating agent such as naphthenic acid, coconut oil fatty acids and the like and is then calcined at temperatures of 200–400° C. in order to convert the normally yellow product into a brown pigment. The length of the calcination treatment is inversely proportional to the temperature employed; i. e., where the material is calcined at about 400° C. it should be maintained at this temperature for a short time on the order of 15–20 minutes, while the heating period may extend to about 3–4 hours or longer when the calcination is carried out at temperatures in the neighborhood of 200° C. Reference to C₁ of the drawing will show that a red pigment, instead of a brown pigment, is obtained when the quantity of organic flocculating agent is reduced to 5–10%, using substantially the same temperatures and times of calcination.

The calcined iron oxide products have transparency values substantially below 75, and therefore require a further treatment to convert them into transparent products. We have found, as an important feature of our invention, that transparent iron oxide pigments varying from a relatively low to a relatively high degree of transparency can be obtained from the calcined red or brown pigments by digesting the latter in water or dilute alkaline solutions at temperatures ranging from about room temperature to the boiling temperature, with or without a preliminary grinding in water or dilute alkali.

Although the invention is not limited by theoretical considerations, we believe that the calcination at 200–400° C. converts the original ferric oxide materials into products which are predominantly of hematite crystal structure and that the subsequent digestion in water or dilute alkali results in a modification and/or growth of these hematite crystals to the optimum, uniform condition for pigment properties and for transparency. The step of mechanical grinding of the calcined material, when employed, serves to assist in breaking up any aggregates that may have been formed during calcining and thus to obtain greater uniformity and better transparency.

The particular operating steps used in obtaining the above-described results are illustrated in Columns I, II and III of Fig. 3. By the procedure of Column I the calcined pigment is simply digested in water for about 1-2 hours or more at temperatures ranging from about room temperature to the boiling temperature, after which the material is dried at a relatively low temperature and a finished product having a transparency value of from 75 to 85 is obtained. The color of this product is, of course, the same as the color of the calcined material; i. e. brown or red, depending upon the amount of flocculating agent that was employed.

If a pigment having a somewhat higher degree of transparency is desired, the procedure illustrated in Column II may be applied. A dilute aqueous solution of alkali is substituted for the water employed in Column I, which results in an increase of the transparency to about 85-95. Any water-soluble alkali may be employed such as sodium carbonate, sodium hydroxide and the like in quantities sufficient to increase the pH of the solution to about 13. Good results have been obtained with a 1% sodium carbonate solution (pH of about 10.5) and with a 1% solution of sodium hydroxide (pH of about 12.5). More dilute solutions may, of course, be employed if desired. After completing the digestion the pigment is flocculated and neutralized by neutralizing or slightly acidifying the slurry with an acid such as sulfuric acid followed by filtration, washing to remove soluble salts, and drying at a relatively low temperature. It will be understood that in either of the procedures described in Columns I and II the pigment may be surface coated prior to drying, if desired.

Where the most highly transparent brown iron oxide pigment is desired the procedure illustrated in Column III may be followed. The calcined pigment is first subjected to a grinding treatment in a dilute aqueous alkaline medium, after which it is digested in the same or other dilute aqueous alkaline medium for about one or more hours. The digested material is then surface coated with an organic lyophilic surface coating agent as hereinbefore described, and is thereafter dried at a relatively low temperature. The product is a brown pigment having a transparency value of from about 90 to about 98. The grinding treatment of this procedure may also be applied to the procedures of Columns I and II.

As previously discussed, we have found that our novel pigments may be dried and maintained substantially free from aggregation for long periods of time when the products contain less than about 1% of combined anion. The materials illustrated in Fig. 3 represent such iron oxide pigments. It will be readily understood that the grinding and/or digestion procedures illustrated in Columns I, II and III of this figure, which have been described above in reference to our novel brown and red transparent iron oxide pigments, represent an important means of lowering still further the combined anion content of the pigment. Analyses have indicated that the amount of combined anion retained by these pigments is usually less than 0.5% of the weight of the pigment after these procedures have been used.

Referring to E on Fig. 3 of the drawings, it will be seen that a golden yellow transparent pigment is obtained directly when 0.6%-5% or more of any of the crystal growth directors described above is used. However, there is a marked difference in the properties of this material upon calcination, depending upon whether an organic or an inorganic crystal growth director was employed. By using 0.6% or more of an organic director such as tartaric acid, citric acid and the like, a product is obtained which seems to have much the same calcining properties as those described with reference to B and $C_2$ on the drawing. This type of product can be converted by flocculating with 5-10% of a flocculating agent and calcining at 200-400° C. into a pigment which is similar in color to that of $C_1$ except that its shade is somewhat cleaner and deeper red. This calcined product can be finished by any of procedures I, II and III, or by any combination thereof, to produce a transparent red pigment. However, the product obtained by oxidizing the ferrous precipitates in the presence of 0.6% or more of an inorganic crystal growth director, such as an alkali metal silicate or a zinc salt, produces an orange-red opaque pigment upon calcination that cannot be converted into a transparent pigment by the subsequent treatments shown on the drawing.

In the event that an iron oxide pigment produced according to the method of this invention is to be directly incorporated into a film-forming composition, it may be desirable, in some instances, to transfer the wet pigment into the vehicle without previous drying treatment. In such cases any of the ordinary flushing treatments may be resorted to. However, for most practical, economic purposes it will be readily understood that the iron oxide pigments are in most desirable marketable state when packaged as dry powders which may be easily redispersed in the final film-forming compositions. The above-described method of surface coating our novel iron oxide pigments permits the commercial preparation of such dry pigments and thus fulfills a long-felt demand of the coating and printing ink industry.

The following examples will more clearly illustrate the method of our invention, it being understood, however, that the examples are given for purposes of illustration only, the limits of the invention being defined by the appended claims. In the examples the term "copperas" means $FeSO_4.7H_2O$. The term "stoichiometric equivalent" as used in the foregoing description means the molecular equivalent of the ferrous component; i. e., the molecular equivalent of $FeSO_4$ or $FeCl_2$ is, for example, 2 mols of NaOH.

*Example 1*

One liter of an aqueous solution containing 188 gm. of copperas (equivalent to 60 gm. of

$Fe_2O_3.H_2O$)

was added to 1 liter of an aqueous solution containing 108 gm. of NaOH (200% of stoic. amt.) at 25°-30° C. The mixture, containing the equivalent of 30 gm./liter of $Fe_2O_3.H_2O$, was stirred for about 10 minutes, and was thereafter aerated for about 8 hours at 25°-30° C. The final slurry was yellow colored.

The yellow slurry was washed with water, filtered, and washed with small amounts of ethyl alcohol and benzol. The pigment was then dried at 50°-55° C. Upon analysis it was determined that the individual particles were needle-shaped crystals and that the pigment had a specific surface of approximately 65 square meters per gram.

The $SO_3$ content of this material, calculated as $Na_2SO_4$ was 0.2%.

0.5 gm. of the dried pigment and 1.5 gm. of a mixed plasticizer comprising 1 part of raw castor oil, 1 part of blown castor oil, and 1 part of dibutyl phthalate, were mixed and ground on a Hoover Muller (lab. grinding machine employing 2 flush circular ground plates under pressure, one rotor and one stator).

0.5 gm. of the paste so obtained was then thinned with 10 grams of a lacquer composite formulated as follows:

240 parts of a nitrocellulose lacquer at 28% non-volatile solids.
70 parts of a maleic anhydride modified ester gum at 50% non-volatile solids.
15 parts of blown castor oil
15 parts of dibutyl phthalate
20 parts of a non-oxidizing glycerol modified alkyd resin at 60% solids
90 parts of butyl acetate Composite: volatile—308; non-volatile—142 (in the composite, the pigment concentration was 4.6% by weight of the non-volatile residue).

A 0.005" thick film of the above composite was pulled down on a plate glass for evaluation by both transmitted and reflected light. The film had a transparency value of 77, and possessed a clean yellow color tone.

Example 2

At a temperature of 25°—30° C. 1 liter of an aqueous solution containing 188 gm. of copperas was added to 1 liter of an aqueous solution containing 108 gm. of NaOH to which had been added 3 drops of ricinoleic acid to provide a soap concentration of about 1 part in 20,000 parts. The mixture was stirred for about 10 minutes, and was thereafter aerated at the same rate as in Example 1 for 6 hours at 25°–30° C. The final slurry was yellow, but was somewhat darker than that of Example 1.

300 ml. of this slurry was diluted to 1 liter with water, and admixed with 180 ml. of saponified castor oil at 100 gm./liter concentration. This mixture was acidified to 5.5 pH, and the resultant paste was mulled until substantially all of the water was removed. 1.5 gm. of this flushed paste at 33% pigment content was incorporated in a lacquer similar to that of Example 1. The dried film had a transparency value of 83, and possessed a clean yellow color tone. It will be noticed that employment of a small amount of a surface tension lowering agent (here, ricinoleic acid) resulted in lowering of the oxidation cycle to 6 hours as compared with the 8 hour oxidation treatment of Example 1.

Example 3

One liter of an aqueous solution containing 188 gm. of copperas was added to 1 liter of an aqueous solution containing 108 grams of NaOH for about 10 minutes, and was thereafter aerated for 6 hours at 45°–50° C. The final slurry was light yellow in color. The particles were quite coarse needles and the material had a specific area of only about 45 square meters per gram. The product, when evaluated in a lacquer, had a transparency value of only 67 and while unsuitable as a transparent pigment at this particular pigmentation, possessed a pleasant yellow tint when reduced with zinc oxide paste and employed as an opaque film. The final pigment contained 0.15% $SO_3$ calculated as $Na_2SO_4$.

Example 4

At a temperature of 25°–30° C., one liter of an aqueous solution containing 63 gm. of copperas was added to one liter of an aqueous solution containing 36 gm. of NaOH to which had been added 2 drops of castor oil. The mixture was stirred for about 10 minutes, and was thereafter aerated for about 1 hour at 25°–30° C. until the iron was 99% converted to the ferric state. The final slurry was brown colored, and the product had a specific area of about 140 square meters per gram and an $SO_3$ content of 0.3% calculated as $Na_2SO_4$. The product was evaluated in a lacquer in a manner similar to that of Example 2 except that the flushed paste was a 25% pigment concentration; and a dried film thereof had a transparency value of 95, and had a most pleasing lemon-yellow color.

The above example was repeated employing 50 gm. of KOH. The final pigment-containing film had a transparency value of about 95, and was essentially comparable to the previously prepared pigment of this example. The $SO_3$ content of the pigment was also essentially the same as that of the pigment described above.

Example 5

One gram of the dried pigment of Example 1 and 1.5 gm. of a polymerized linseed oil were mulled together to a smooth paste. 0.2 gm. of this paste was admixed with a ZnO paste previously ground and composed of 1 part of a polymerized linseed oil and 4 parts ZnO. A film of this coating material appeared as a cleaner and more yellow shade than a similarly prepared coating material made with synthetic yellow iron oxide pigments of prior art procedures.

Example 6

One liter of an aqueous solution containing 188 gm. of copperas was added to one liter of an aqueous solution containing 108 gm. of NaOH, 0.3 gm. of $SiO_2$ which was added as a silicate solution containing 100 gm. per liter $SiO_2$ and 2 drops of castor oil at a temperature of 25°–30° C. The mixture was stirred for about 10 minutes, and was thereafter aerated for 5 hours. The product had a specific area of about 100 square meters per gm., and the final slurry was yellow.

The finished slurry was flushed into ricinoleic acid at a pigmentation of 33% and was thereafter incorporated in a lacquer in a manner similar to that of Example 1.

This lacquer was then applied to plate glass in film thicknesses varying from 0.003" to 0.008" and evaluated for color tone and transparency. The transparency values were about 90, and the films were of rich yellow tone.

Example 7

810 lbs. of commercial caustic soda flakes dissolved to a total volume of 1700 gals. at 25° C. was charged to a steel tank equipped with an agitator, cooling and heating coils, and two aeration tubes containing about 700–800 ⅛" holes and connected to an air compressor with a capacity of 200 cubic feet per minute. A quantity of sodium silicate equivalent to 12 lbs. of $SiO_2$ was added with caustic soda. 60 gm. of saponified castor oil was added to the aqueous caustic as a frothing agent.

2000 lbs. of copperas dissolved to a total volume of 400 gals at 25° C. and having a pH of 2.2 was added to the aqueous caustic over a period of 15 minutes. The mixture was adjusted with water to a total volume of 2400 gal., after which it was agitated for 15 minutes.

The mixture was then aerated for 4 hours employing 200 cubic ft./min. of air. The rate of oxidation was determined by permanganate titration with the following results:

| Time Hrs. | Extent of Oxidation, Per Cent |
|---|---|
| 1 | 40 |
| 2 | 60 |
| 3 | 85 |
| 4 | 100 |

The oxidation was carried out at 25°–30° C., the charge being agitated continuously.

To the final slurry was aded 210 lbs. of castor oil which has been saponified with NaOH. The composite was mixed and diluted with water to 7800 gal. at 25° C. Thereafter the mixture was acidified to pH 6 with 10% $H_2SO_4$ and adjusted to 8850 gal. at 25°–30° C., followed by mixing for one hour. A floc formed and after settling for two hours, 6000 gal. of supernatant liquor was drawn off. The remainder was diluted again and adjusted as above described. This procedure was repeated until the material had been washed 7 times. The final washed precipitate was filtered in a frame press wherein the press cake was washed with 3000 gal. of water, after which the filter cake was dried at 45°–50° C. to a moisture content of 5%. The dried material was thereafter ground in a micropulverizer. Analysis of the material showed that the $SO_3$ content calculated as $Na_2SO_4$ was 0.1%.

The pulverized pigment was then ground with a castor oil modified alkyd resin to form a paste which was thereafter incorporated into an alkyd resin enamel consisting of 80% of a semi-oxidizing soya fatty acid and castor oil-modified phthalic glyceride resin of medium oil length, and 20% of a butylated melamine resin-alkyd resin blend. The final enamel composition contained 1.5% pigment (calculated as $Fe_2O_3 \cdot H_2O$), based on the non-volatile content of the enamel, and 98.5% vehicle.

A dried film of this pigment-containing enamel exhibited a transparency value of 92, and the film had a clean yellow color tone.

Example 8

(A) 188 gm. of copperas dissolved in water to one liter at 25°–30° C. at a pH of about 2 was added to a mixture of 108 gm. of NaOH dissolved in water to one liter at 25°–30° C. and to which mixture had been added two drops of castor oil. The composite was mixed for about 10 minutes and was thereafter aerated for about 5 hours at 25°–30° C. The finished slurry was flushed into ricinoleic acid at a pigmentation of 33% in the flushed pulp. This alkaline slurry was then treated with saponified castor oil and the composite acidified to a pH of about 5 whereupon the pigment was collected in the oil phase.

The flushed pigment was then admixed with a nitrocellulose lacquer to produce a coating composition having a pigmentation of about 5%. Dried films thereof had transparency values of about 85, and presented a rich yellow color tone.

(B) The procedure of (A) was repeated in detail except that 3 ml. of a sodium silicate solution, containing 100 gm. per liter $SiO_2$, was added to the reaction medium prior to the aeration treatment.

The product, when incorporated in lacquer films, had a transparency value of about 92, and was an attractive translucent yellow color.

(C) The procedure of (A) was repeated in detail except that 6 ml. of a sodium silicate solution, containing 100 gm. per liter $SiO_2$, was added to the reaction mixture prior to the aeration treatment.

The product, when incorporated in lacquer films as previously described, had a transparency value of about 97, and possessed an orange-gold color.

Example 9

(A) 188 gm. of copperas dissolved in water to one liter at 25° C. was added to an aqueous mixture comprising one liter of water containing 80.9 gm. of caustic soda, and sodium silicate equivalent to 1.2 gm. of $SiO_2$. The composite was mixed for 5 minutes and then the slurry was aerated at 25° C. for about 5 hours.

When the washed precipitate was dried without surface coating treatment, a yield of about 60 gm. of a product containing 0.4% combined sulfates was obtained. The pigment had a transparency value of 78 when applied as a clear film. However, after storage in a moist atmosphere for several days, the pigment had agglomerated to a considerable extent.

(B) The procedure of (A) was repeated with the exception that the oxidized slurry was boiled for ½ hour, cooled, and treated with 25 gm. of castor oil which had been completely saponified with caustic soda. The composite was mixed, acidified to 6 pH with sulfuric acid and again mixed, inducing a heavy floc of the pigment. The treated slurry was then filtered and washed; the filterability was very good.

When the product was applied in a lacquer film, the dried film had a transparency value of 97, and possessed a clean golden color tone. The product had an $SO_3$ content of 0.1%. Storage of this coated pigment did not affect the redispersibility thereof to a noticeable degree.

When the above example was repeated employing 25 gm. of oleic acid, and in another instance 30 gm. of naphthenic acid, as the surface coating agent, the final products exhibited transparency values essentially equal to that of the above surface coated product and the coated pigments did not agglomerate under adverse storage conditions. Additional coating agents which have been found to give satisfactory results are talloil acids, lauric acid, myristic acid, palmitic acid, fish oil acids containing about 22 carbon atoms, and like materials.

Example 10

1 liter of an aqueous solution containing 188 gm. of copperas was added to 1 liter of an aqueous solution containing 108 gm. of NaOH which had been cooled to a temperature of 0° C. The mixture was stirred for about 10 minutes and was thereafter aerated for ¾ hr. at a temperature of about 7° C.

The precipitate was washed with water and to the washed slurry was added ricinoleic acid in an amount sufficient that the pigment-containing paste obtained when the water was removed contained about 20% pigment by weight. The flushed pigment was incorporated in a lacquer in a manner similar to that employed in Example 1. A dried film of the pigment-containing lacquer had a transparency value of 99 and possessed a clear lemon-yellow tone. The final washed pigment contained 0.5% $SO_3$ calculated as $Na_2SO_4$.

Example 11

507 pounds of commercial caustic soda flakes dissolved to 2300 gallons at 25° C. was charged to a steel tank equipped with agitators, cooling and heating coils and two aeration tubes containing about 700-800 1/8" holes and connected to an air compressor with a capacity of 200 cu. ft./min. 7½ pounds of tartaric acid were added to the caustic soda solution.

289 gallons of an aqueous copperas solution containing the equivalent of 156 gms./l $Fe_2O_3.H_2O$ was added to the tank and a composite was diluted to 3000 gallons after which it was agitated for about 5 minutes.

The mixture was then aerated for ¾ hr. employing 200 cu. ft./min. of air at a temperature of 25° C. 150 lbs. of castor oil, previously saponified with 75 lbs. of caustic soda in 250 gallons of water, was added to the mixture. The mixture was then diluted to a total volume of 7800 gallons, acidified to 6 pH, and allowed to settle for 2 hours, after which 4500 gallons of supernatent liquor was drawn off. The remainder was diluted again until the mixture had been washed 7 times. The final washed precipitate was filtered in a frame press, dried at 50° C., and thereafter ground in a micropulverizer. The pigment was found to contain 0.06% $SO_3$.

A dried film of this pigment, incorporated in an enamel in a manner similar to that of Example 7, had a transparency value of 98.

Prior to the addition of the saponified castor oil, a portion of the slurry was withdrawn. Portions of this slurry were treated with various resins, such as diethylene glycol modified castor oil-azelaic acid alkyd resins, non-oxidizing 2-ethylhexoic acid-pentaerythritol alkyd resins, rosin-dibasic acid type resins, terpene-dibasic acid type resins, and the like resins which have been found to be particularly well adapted for affording the most satisfactory redispersion of the pigment in various alkyd and lacquer vehicles.

Ordinarily, these resins are employed as alkali solutions which are obtained by dissolving about 20-30 gm. of the desired resin in 1 liter of a 5% aqeuous ammonia solution.

In the case of a diethylene glycol modified castor oil-azelaic acid alkyd resin, best results have been obtained when 1 liter of iron oxide slurry containing the equivalent of 15 gm./l of $Fe_2O_3.H_2O$ has been treated with 375 ml. of the above described alkaline resin solution, mixed, acidified to pH 6, and filtered, washed, and dried.

In the case of various of the other above-named resins, 525 ml. of alkaline resin solution was employed.

Lacquer and enamel films prepared from pigment finished with these resins possessed transparency values in excess of 90.

Example 12

188 gm. of copperas dissolved to 1 liter at about 30° C. was added to 1 liter of an aqueous solution containing 81 gm. of NaOH to which 0.3 gm. of tartaric acid had been added. The composite was mixed for 10 minutes at about 30° C., and was then aerated at 30° C. for 1.25 hours.

When the pigment thus obtained was finished and incorporated in an enamel according to the method of Example 7, a dried film thereof had a transparency value of 97, and the film was a lemon yellow color.

Example 13

The procedure of Example 2 was followed, except that 3.3% of Zn in the form of 8.8 gm. of $ZnSO_4$ was added to the reaction medium as a crystal growth director.

A dried lacquer film containing 5% of this pigment had a transparency value of 88.

Example 14

The procedure of Example 2 was followed, except that 1% (0.6 gm.) of citric acid was added to the reaction medium as a crystal growth director.

A dried lacquer film containing 5% of this pigment had a transparency value of 90, and had a yellow color tone.

Example 15

282 gm. of copperas dissolved to 1 liter was added to 3 liters of an aqueous solution containing 243 gm. of NaOH at a temperature of about 25° C. The mixture was aerated for 25 hours, and a sample of the washed and dried pigment had a specific surface area of 32 sq. meters/gm., and had a transparency value of 66. The pigment was yellow colored.

267 ml. of the above iron oxide slurry was acidified to 3.5 pH with dilute $H_2SO_4$, and added to 2 liters of an aqueous copperas solution containing the equivalent of 88 gm. of $Fe_2O_3.H_2O$. The mixture was aerated, according to the method set forth in U. S. Pat. No. 2,388,659 to Ryan and Sanders, at a temperature of 80° C. while continuously adding a solution of soda ash to maintain the pH at 3.3-3.5 until all of the iron was oxidized. The precipitate was then filtered, washed, and dried.

The pigment so obtained was a lemon yellow shade of synthetic iron oxide, but possesses a brightness of mass tone greatly increased over that of the Ryan and Sanders method.

Example 16

615 ml. of an aqueous ferrous chloride solution containing a total iron content equivalent to 40 gm. of $Fe_2O_3.H_2O$ was added to 1385 ml. of an aqueous solution containing 72 gm. of NaOH at about 25° C. The composite was mixed for 10 minutes and was thereafter aerated for 1 hour at a temperature of about 25° C. The precipitate was flushed into ricinoleic acid at a pigment solids content of 25%. Analysis of the pigment showed a chloride content of less than 0.1% calculated as NaCl.

The pigment so obtained was incorporated into a clear lacquer and applied as a wet film having a thickness of 0.005 inch. The dried film had a transparency value of 92 and was a clean lemon-yellow in color.

Example 17

The procedure of Example 16 was followed, except that 0.8 gm. of tartaric acid was added to the reaction mixture prior to the aeration treatment and the oxidation was completed in ½ hour. The chloride content of the pigment was less than 0.1% calculated as NaCl.

When the so-produced pigment was incorporated in a clear lacquer film, the dried film had a transparency value of 93 and was golden colored.

Example 18

615 ml. of an aqueous ferrous chloride solution containing a total iron content equivalent to 40 gm. of $Fe_2O_3.H_2O$ was added to 1385 ml. of an aqueous solution containing 67 gm. of commercial hydrated lime at a temperature of about 25°

C. The composite was mixed for 10 minutes at which point the slurry had a pH of 12 measured with a glass electrode. The mixture was aerated for 1 hour at a temperature of 25° C. The slurry was thereafter acidified with HCl to about 6 pH, filtered, washed, and repulped with water. The washed slurry was then flushed into ricinoleic acid as a 25% pigment paste. The chloride content of the pigment was 0.08% calculated as $CaCl_2$.

The pigment was thereafter incorporated in a clear lacquer and a dried film thereof had a transparency value of 98 and was golden yellow colored.

Example 19

1 liter of an aqueous solution containing 125 gm. of $FeSO_4.7H_2O$ was added to 1 liter of an aqueous solution containing 41.4 gm. of NaOH at a temperature of 25° C. Sufficient sodium silicate to afford 0.8 gm. $SiO_2$ was added to the mixture. The composite was mixed for 10 minutes and was thereafter aerated for 1 hour at about 25–30° C. The slurry was flushed into ricinoleic acid at a pigment concentration of 30%.

A dried lacquer film containing this pigment had a transparency value of 94 and was golden yellow colored.

Example 20

1 liter of an aqueous solution containing 125 gm. of $FeSO_4.7H_2O$ was added to 1 liter of an aqueous solution containing 49 gm. of NaOH at a temperature of about 25° C. The composite was mixed for 10 minutes and was aerated for 2 hours at a temperature of about 25° C. The slurry thus obtained was flushed into ricinoleic acid at a pigment concentration of 25%. The $SO_3$ content of this pigment was 0.7% calculated as $Na_2SO_4$.

When the so-produced pigment was incorporated in a clear lacquer, a dried film thereof had a transparency value of 91 and was light yellow colored.

Example 21

One liter of an aqueous solution containing 188 gm. of copperas was added at a temperature of 25°–30° C. to one liter of an aqueous solution containing 108 gm. of NaOH to which had been added 3 drops of ricinoleic acid to provide a soap concentration of about 1 part in 20,000 parts. The mixture was stirred for about 10 minutes and was thereafter aerated according to the procedure of Example 2 to prepare a yellow colored slurry of iron oxide.

5 gm. of naphthenic acid was added to the slurry and the mixture was then acidified to 6 pH, filtered, washed, and dried. The dried product was calcined for one hour at 300° C., directly quenched in water and ground in a mortar. The ground material was then diluted with water to a 10% solids slurry, digested at a boil for one hour, and then filtered, washed, and dried at 50° C. The product had a combined anion content of 0.5% and when evaluated in a lacquer film had a clean orange-red color and a transparency value of 77.

Example 22

One liter of an aqueous solution containing 63 gm. of copperas was added at a temperature of 25°–30° C. to one liter of an aqueous solution containing 36 gm. of NaOH to which had been added 2 drops of castor oil. The mixture was thereafter aerated according to the procedure of Example 4.

One gm. of naphthenic acid was added to the iron oxide slurry which was then mixed, acidified to 6 pH, filtered, washed twice, and dried. The dried product was then heated from 200° C. to 300° C. over a period of one hour and was maintained at 300° C. for an additional hour. The calcined material was directly water quenched, broken up lightly in a mortar, and diluted to 500 ml. with water. 5 gm. of soda ash was added, and the composite was boiled for one hour. The slurry was then acidified to 6 pH, filtered, washed free of salts, and dried at 50°–60° C. The product had an $SO_3$ content of 0.2%, and when evaluated in a lacquer film had a clean, slightly-orange red color and a transparency value of 98.

Example 23

One liter of an aqueous solution containing 188 gm. of copperas was added to 1 liter of an aqueous solution containing 108 gm. of NaOH and 2 ml. of sodium silicate solution, containing 100 gm. per liter of $SiO_2$, which had been cooled to a temperature of 0° C. The mixture was stirred for about 10 minutes and was thereafter aerated according to the procedure of Example 10.

The oxidized slurry, equivalent to 60 gm. of FeOOH, was then heated to 45° C., treated with 3 gm. of naphthenic acid, acidified to 6 pH, filtered, washed twice, and dried. The product was then calcined for 15 minutes at 350° C., quenched in water, broken up in a mortar, and diluted with water to a volume of 1 liter. 10 gm. of soda ash was then added, and the composite was digested at about 80° C. for one hour, then neutralized to 7 pH, filtered, washed, and dried. The product was an orange-red colored pigment when evaluated in a lacquer coating, and had a transparency rating of about 92, and an $SO_3$ content of 0.3%.

Example 24

A precipitated iron oxide was prepared according to the procedure of Example 22, except that the iron oxide slurry was treated with 2 gm. of saponified castor oil. The composite was neutralized, filtered, and dried at 50° C. The dried material was calcined in a carbon dioxide atmosphere at 300° C.–350° C. for 17 minutes, water quenched, broken up in a mortar, and diluted with water to a volume of 500 ml. 5 gm. of $Na_2CO_3$ was added to the mixture, which was thereafter digested at a boil for about one hour. The mixture was then neutralized, filtered, washed, and dried at 50° C. The product had an $SO_3$ content of 0.4%, and when evaluated in a lacquer film was brown colored and had a transparency value of 92.

Example 25

A portion of the oxidized slurry obtained in the procedure of Example 11 and containing the equivalent of 40 gm. of FeOOH, was treated with 2 gm. of naphthenic acid, neutralized to pH 6, filtered, washed and dried. The material was calcined at 200° C. for one hour and then heated for an additional hour at 250° C. The calcined material was quenched in water, broken in a mortar and added to 500 gm. of water containing 5 gm. of $Na_2CO_3$. This mixture was ground in a ball mill for about 40 hours, after which it was digested at about 80° C. for one hour. The slurry was then neutralized, filtered, washed, and dried at 50° C. The product was relatively deep-red colored, had a $SO_3$ content of 0.1%, and when evaluated in a lacquer film had a transparency value of 94.

This is a continuation-in-part of our copending application Serial No. 767,069 filed August 7, 1947, and now abandoned.

What we claim is:

1. A method of producing a crystalline iron oxide pigment of improved color which comprises adding a water-soluble ferrous salt to an aqueous solution containing at least 130% of its stoichiometric equivalent of an alkali-forming metal hydroxide at a temperature below 40° C., and then oxidizing the resulting suspension at a temperature below 40° C. within a period of time of from about 15 minutes to 30 hours until substantially all of the iron content of the said suspension is converted to ferric state.

2. A method according to claim 1 in which the alkali-forming metal hydroxide is an alkali metal hydroxide.

3. A method according to claim 1 in which the oxidation is carried out by passing air through the suspension.

4. A method of producing a crystalline iron oxide pigment of improved color which comprises adding a water-soluble ferrous salt to an aqueous solution containing at least 130% of its stoichiometric equivalent of an alkali-forming metal hydroxide at a temperature below 40° C., then oxidizing the resulting suspension at a temperature below 40° C. and within a period of time of from about 15 minutes to 30 hours until substantially all of the iron content of said suspension is converted to ferric state, thereafter coating the resulting iron oxide pigment particles with from 5% to about 40% of their weight of an organic lyophilic coating agent as a substantially monomolecular layer of the organic lyophilic coating agent, and then calcining the treated pigment particles at 200° C.–400° C. for a period of time not greater than about 3 hours.

5. A method of producing a crystalline iron oxide pigment of improved color and uniformity of particle size which comprises adding a water-soluble ferrous salt to an aqueous solution containing at least 115% of its stoichiometric equivalent of an alkali-forming metal hydroxide at a temperature below 40° C., oxidizing the resulting suspension at a temperature below 40° C. in the presence of not more than 5%, based on the weight of the $Fe_2O_3 \cdot H_2O$ equivalent of the iron salt, of a member of the group consisting of water-soluble salts of zinc and of tartaric, citric, tannic and silicic acids, within a period of time of from about 15 minutes to 30 hours until substantially all of the iron content of said suspension is converted to ferric state.

6. A method according to claim 5 in which the alkali-forming metal hydroxide is sodium hydroxide.

7. A method of producing a crystalline iron oxide pigment of improved color and uniformity of particle size which comprises adding a water-soluble ferrous salt to an aqueous solution containing at least 115% of its stoichiometric equivalent of an alkali-forming metal hydroxide at a temperature below 40° C., oxidizing the resulting suspension at a temperature below 40° C. in the presence of from 0.1% to 0.5%, based on the weight of the $Fe_2O_3 \cdot H_2O$ equivalent of the iron salt, of a member of the group consisting of water-soluble salts of zinc and of tartaric, citric, tannic and silicic acids, within a period of time of from about 15 minutes to 30 hours until substantially all of the iron content of said suspension is converted to ferric state, thereafter coating the resulting iron oxide pigment particles with from 5% to about 40% of an organic lyophilic coating agent as a substantially monomolecular film, and calcining the coated pigment particles at 200° C.–400° C. for a period of time not greater than about 3 hours.

8. A method according to claim 7 in which the coated and calcined iron oxide pigment particles are digested in an aqueous medium having a pH of from about 7 to about 13 and thereafter dried at a pH of about 7.

9. A method according to claim 7 in which the coated and calcined pigment particles are ground for 24–48 hours in dilute aqueous alkali, digested in dilute aqueous alkali, neutralized to a pH of approximately 7, coated with a substantially monomolecular layer of an organic lyophilic coating agent, and dried.

10. A method according to claim 7 in which the alkali-forming metal hydroxide is sodium hydroxide.

11. A method of producing a crystalline iron oxide pigment of improved color and uniformity of particle size which comprises adding a water-soluble ferrous salt to an aqueous solution containing at least 115% of its stoichiometric equivalent of an alkali-forming metal hydroxide at a temperature below 40° C. oxidizing the resulting suspension at a temperature below 40° C. in the presence of from 0.6% to 5%, based on the weight of the $Fe_2O_3 \cdot H_2O$ equivalent of the iron salt, of a member of the group consisting of water-soluble salts of zinc and of tartaric, citric, tannic and silicic acids, said oxidation being carried out within a period of time of from about 15 minutes to 30 hours until substantially all of the iron content of said suspension is converted to ferric state, and thereafter coating the resulting iron oxide pigment particles with from 5% to about 40% of an organic lyophilic coating agent as a substantially monomolecular film and calcining the coated pigment particles at 200° C. – 400° C. for a period of time not greater than about 3 hours.

12. A method according to claim 11 in which the coated and calcined iron oxide pigment particles are digested in an aqueous medium having a pH of from about 7 to about 13 and thereafter dried at a pH of about 7.

13. A method according to claim 11 in which the coated and calcined pigment particles are ground for 24–48 hours in dilute aqueous alkali, digested in dilute aqueous alkali, coated with a substantially monomolecular layer of an organic lyophilic coating agent and dried.

14. A method of producing a crystalline iron oxide pigment of improved color and uniformity of particle size which comprises adding a water-soluble ferrous salt to an aqueous solution containing at least 130% of its stoichiometric equivalent of a water-soluble alkali-forming metal hydroxide at a temperature below 40° C., oxidizing the resulting suspension at a temperature below 40° C. within a period of time of from about 30 minutes to 10 hours until substantially all of the iron content of said suspension is converted to ferric state, the temperature and oxidation period being so correlated as to produce an iron oxide pigment characterized by a visibility value $$\frac{T_D}{T_T}$$

of at least 85 for unscattered transmitted light when measured in a film pigmented therewith having a wet thickness of about 0.005 inch where for wave lengths of 400 to 700 millimicrons $T_D$ equals amount of light transmitted undeviated and $T_T$ equals the sum of the amount of light transmitted but scattered and the light transmitted undeviated, and thereafter coating the resulting iron oxide pigment particles with from 5% to about 40% of an organic lyophilic coating agent as a substantially monomolecular layer of the organic coating agent, and then drying the coated pigment.

15. A method according to claim 14, in which the coated iron oxide pigment particles are calcined at 200°–400° C. for a period of time not greater than about three hours.

16. A method according to claim 15, in which the calcined iron oxide particles are digested in an aqueous medium, followed by drying.

17. A method according to claim 16, in which the digestion treatment is carried out in an aqueous medium having a pH of from about 7 to about 13, thereafter neutralizing the digestion medium, and then drying the pigment.

18. A method according to claim 17, in which the digested iron oxide pigment particles are coated with a substantially monomolecular layer of an organic lyophilic coating agent prior to the drying thereof.

19. A method according to claim 15, in which the calcined iron oxide pigment particles are subjected to a grinding treatment in dilute alkali, and thereafter dried.

GUY C. MARCOT
WINFRED J. CAUWENBERG.
STEPHEN A. LAMANNA

REFERENCES CITED

The following references are of record in the file of this patent:

UNITED STATES PATENTS

| Number | Name | Date |
|---|---|---|
| 1,327,061 | Penniman et al. | Jan. 6, 1920 |
| 1,337,402 | Hemingway | Apr 20, 1920 |
| 1,368,748 | Penniman et al. | Feb. 15, 1921 |
| 1,392,926 | Fireman | Oct. 11, 1921 |
| 1,832,417 | O'Brien | Nov. 17, 1931 |
| 2,111,727 | Plews | Mar. 22, 1938 |
| 2,335,760 | Hucks | Nov. 30, 1943 |
| 2,357,096 | Fireman | Aug. 29, 1944 |
| 2,384,579 | Vesee | Sept. 11, 1945 |

FOREIGN PATENTS

| Number | Country | Date |
|---|---|---|
| 299,919 | Great Britain | Nov. 8, 1928 |
| 313,999 | Great Britain | June 21, 1929 |
| 332,259 | Great Britain | July 15, 1930 |
| 452,734 | Great Britain | Aug. 20, 1936 |

OTHER REFERENCES

Mellor: Comp. Treatise on Inorg. Chem., vol. 13, p. 838, (1934) Longmans, Green and Co.